(12) United States Patent
King et al.

(10) Patent No.: US 12,154,209 B2
(45) Date of Patent: Nov. 26, 2024

(54) EFFICIENT CONVOLUTION OPERATIONS WITH A KERNEL SHADER

(71) Applicant: Imagination Technologies Limited, Kings Langley (GB)

(72) Inventors: Rostam King, Hertfordshire (GB); William Thomas, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 155 days.

(21) Appl. No.: 17/849,539

(22) Filed: Jun. 24, 2022

(65) Prior Publication Data

US 2023/0044249 A1   Feb. 9, 2023

(30) Foreign Application Priority Data

Jun. 25, 2021   (GB) ..................................... 2109207

(51) Int. Cl.
| | |
|---|---|
| *G06T 15/04* | (2011.01) |
| *G06T 15/00* | (2011.01) |
| *G06T 15/10* | (2011.01) |
| *G06T 15/20* | (2011.01) |
| *G06T 15/80* | (2011.01) |

(52) U.S. Cl.
CPC ............ *G06T 15/005* (2013.01); *G06T 15/04* (2013.01); *G06T 15/10* (2013.01); *G06T 15/20* (2013.01); *G06T 15/80* (2013.01)

(58) Field of Classification Search
CPC ......... G06T 15/00; G06T 15/04; G06T 15/10; G06T 15/20; G06T 15/80; G06T 15/205; G06T 1/20; G06T 2200/28
See application file for complete search history.

(56) References Cited

U.S. PATENT DOCUMENTS

| | | |
|---|---|---|
| 5,767,858 A | 6/1998 | Kawase et al. |
| 6,181,352 B1 | 1/2001 | Kirk et al. |
| 7,266,255 B1 | 9/2007 | Wasserman et al. |
| 9,633,469 B2* | 4/2017 | Lum ...................... G06T 15/10 |
| 10,255,655 B1 | 4/2019 | Bergland et al. |
| 10,657,699 B1 | 5/2020 | Giliberto |
| 10,902,605 B2* | 1/2021 | Strugar ................... G06T 7/13 |
| 11,455,770 B2* | 9/2022 | Guo ......................... G06T 1/20 |
| 2014/0267238 A1* | 9/2014 | Lum ...................... G06T 11/40 |
| | | 345/419 |
| 2015/0130818 A1 | 5/2015 | Peng et al. |
| 2015/0130826 A1 | 5/2015 | Peng et al. |
| 2017/0256025 A1 | 9/2017 | Abraham et al. |
| 2019/0096025 A1 | 3/2019 | Nystad et al. |

(Continued)

FOREIGN PATENT DOCUMENTS

GB    2579112 A    6/2020

*Primary Examiner* — Vijay Shankar

(74) *Attorney, Agent, or Firm* — Potomac Law Group, PLLC; Vincent M DeLuca

(57) ABSTRACT

A method of improving texture fetching by a texturing/shading unit in a GPU pipeline by performing efficient convolution operations, includes receiving a shader and determining whether the shader is a kernel shader. In response to determining that the shader is a kernel shader, the shader is modified to perform a collective fetch of all texels used in convolution operations for a group of output pixels instead of performing independent fetches of texels for each output pixel in the group of output pixels.

18 Claims, 11 Drawing Sheets

(56) References Cited

U.S. PATENT DOCUMENTS

| | | | | |
|---|---|---|---|---|
| 2019/0392631 A1* | 12/2019 | Strugar | .................. | G06T 11/20 |
| 2021/0104078 A1 | 4/2021 | Wang et al. | | |
| 2021/0407183 A1* | 12/2021 | Guo | ....................... | G09G 5/363 |
| 2023/0022398 A1* | 1/2023 | King | ....................... | G06T 15/04 |
| 2023/0143192 A1* | 5/2023 | Liktor | ....................... | G06T 5/20 |
| | | | | 382/100 |

* cited by examiner

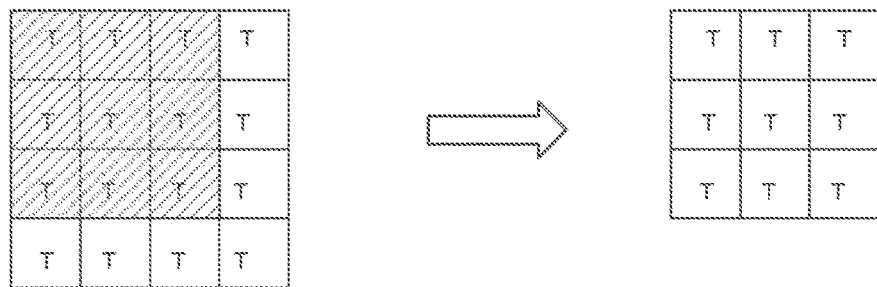
FIG. 17A
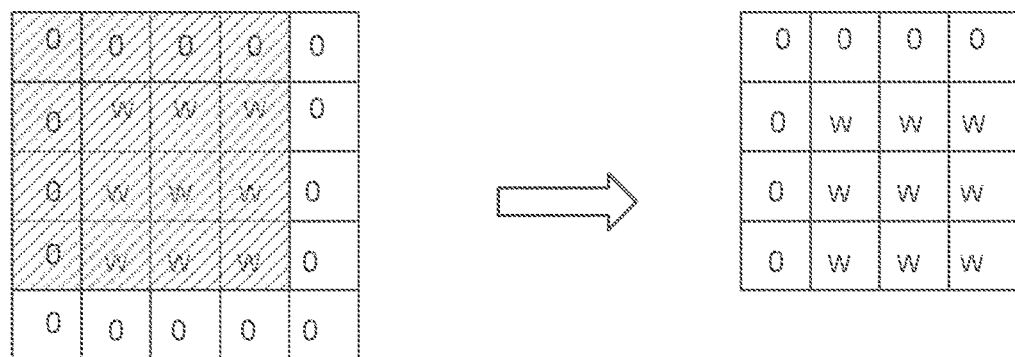
FIG. 17B
FIG. 17C

EFFICIENT CONVOLUTION OPERATIONS WITH A KERNEL SHADER

BACKGROUND

Graphics processing typically involves performing huge numbers of computations to ultimately define the properties of each pixel that is rendered. Fragment shaders (also known as pixel shaders) may be used to compute these properties (e.g. colour and other attributes) where the term 'fragment' may be used to refer to an element of a primitive at a sample position and there may be a 1:1 correspondence between sample positions and pixel positions in the final rendered image. The properties of an output pixel may be dependent upon many texels from a source texture (where this source texture may be an intermediate render target generated by earlier operations within the graphics processing pipeline) and so computing the properties of an output pixel may involve a convolution operation (e.g. calculating a weighted sum of a group of texels from the source texture).

The embodiments described below are provided by way of example only and are not limiting of implementations which solve any or all of the disadvantages of known graphics processing systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method comprising of improving texture fetching by a texturing/shading unit in a GPU pipeline is described. The method comprises receiving a shader and determining whether the shader is a kernel shader. In response to determining that the shader is a kernel shader, the method comprises modifying the shader to perform a collective fetch of all texels used in convolution operations for a group of output pixels instead of performing independent fetches of texels for each output pixel in the group of output pixels.

A first aspect provides a method comprising: receiving a shader; determining whether the shader is a kernel shader; and in response to determining that the shader is a kernel shader, modifying the shader to perform a collective fetch of all texels used in convolution operations for a group of output pixels instead of performing independent fetches of texels for each output pixel in the group of output pixels.

A second aspect provides a method of operation of a texturing/shading unit in a GPU pipeline, the method comprising: collectively fetching, by texture hardware in the texturing/shading unit, all texels required to calculate properties for a group of output pixels; bypassing bilinear filter hardware in the texture hardware and passing the fetched and unfiltered texel data from the texture hardware unit to shader hardware in the texturing/shading unit; and performing a plurality of convolution operations in the shader hardware using the texel data to calculate the properties of each of output pixels in the group of output pixels.

A third aspect provides a texturing/shading unit for use in a GPU pipeline, the texturing/shading unit comprising: texture hardware comprising a fetch unit and bilinear filter hardware; and shader hardware, wherein the texture hardware is arranged to fetch, in the fetch unit, all texels required to calculate properties for a group of output pixels, bypass the bilinear filter hardware and output the fetched and unfiltered texel data to shader hardware, and the shader hardware is arranged to perform a plurality of convolution operations using the texel data to calculate the properties of each of output pixels in the group of output pixels.

A fourth aspect provides a texturing/shading unit configured to perform the methods described herein.

The texturing/shading unit may be embodied in hardware on an integrated circuit. There may be provided a method of manufacturing, at an integrated circuit manufacturing system, a texturing/shading unit. There may be provided an integrated circuit definition dataset that, when processed in an integrated circuit manufacturing system, configures the system to manufacture a texturing/shading unit. There may be provided a non-transitory computer readable storage medium having stored thereon a computer readable description of an integrated circuit that, when processed, causes a layout processing system to generate a circuit layout description used in an integrated circuit manufacturing system to manufacture a texturing/shading unit.

There may be provided an integrated circuit manufacturing system comprising: a non-transitory computer readable storage medium having stored thereon a computer readable integrated circuit description that describes the texturing/shading unit; a layout processing system configured to process the integrated circuit description so as to generate a circuit layout description of an integrated circuit embodying the texturing/shading unit; and an integrated circuit generation system configured to manufacture the texturing/shading unit according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein. There may be provided a computer system comprising one or more processors and a memory, the memory comprising computer readable instructions that, when executed by the one or more processors, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIGS. 17A, 17B and 17C show graphical representations of the data look-up operations in the method of FIG. 16;

Figure 1:
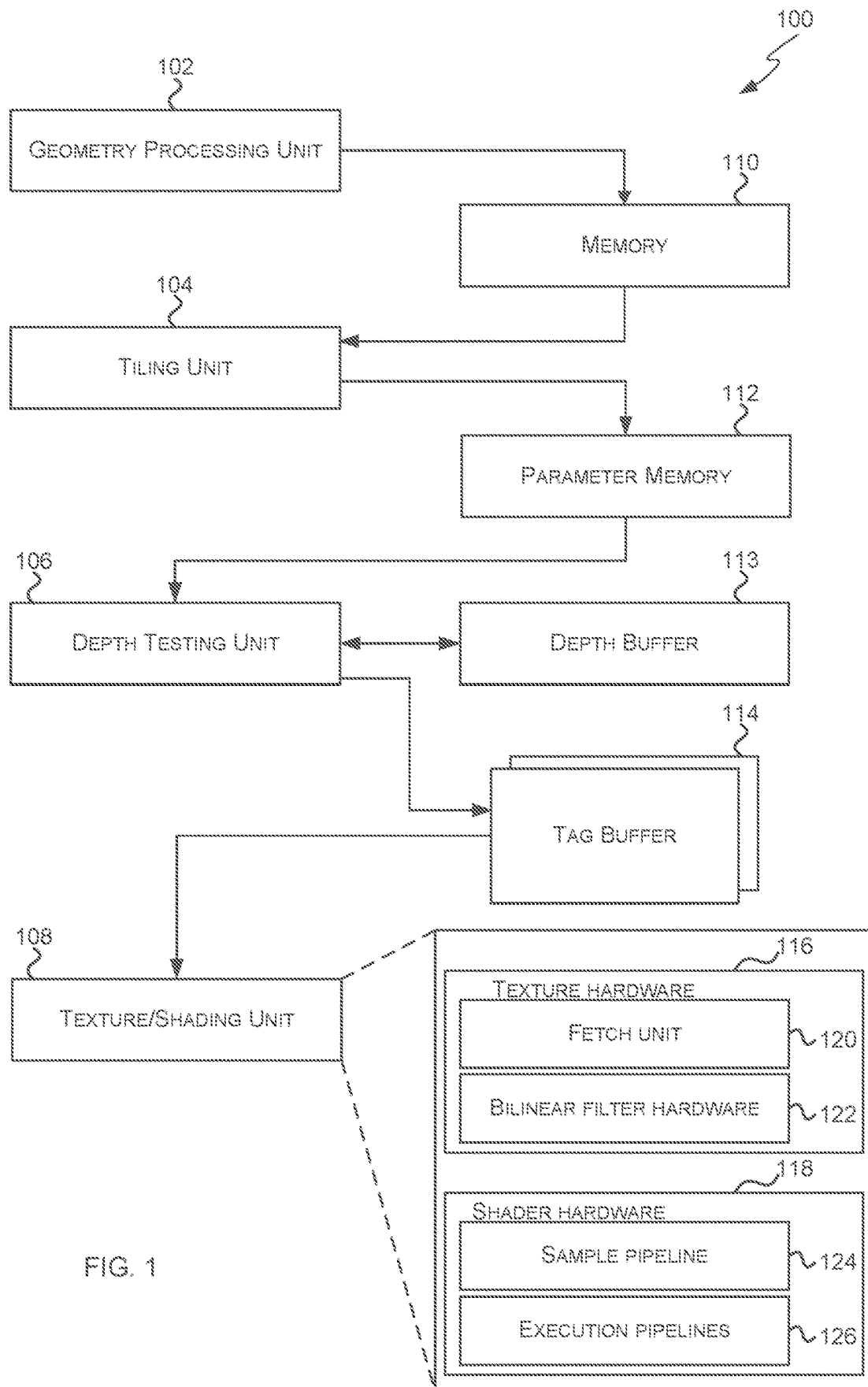
FIG. 1 shows a schematic diagram of an example graphics processing unit (GPU) pipeline

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

FIG. 1 shows a schematic diagram of an example graphics processing unit (GPU) pipeline 100 which may be implemented in hardware within a GPU and which uses a tile-based rendering approach. As shown in FIG. 1, the pipeline 100 comprises a geometry processing unit 102, a tiling unit 104, a depth testing unit 106 (which may also be referred to as a hidden surface removal unit) and a texturing/shading unit (TSU) 108. The pipeline 100 also comprises one or more memories and buffers, such as a first memory 110, a second memory 112 (which may be referred to as parameter memory), a depth buffer 113 and one or more tag buffers 114. Some of these memories and buffers may be implemented on-chip (e.g. on the same piece of silicon as some or all of the GPU 102, tiling unit 104, depth testing unit 106 and TSU 108) and others may be implemented separately. It will be appreciated that the pipeline 100 may comprise other elements not shown in FIG. 1.

The geometry processing unit 102 receives image geometrical data for an application and transforms it into domain space (e.g. UV coordinates) as well as performs tessellation, where required. The operations performed by the graphics processing unit 102, aside from tessellation, comprise per-vertex transformations on vertex attributes (where position is just one of these attributes) performed by a vertex shader and these operations may also be referred to as 'transform and lighting' (or 'transform and shading'). The geometry processing unit 102 may, for example, comprise a tessellation unit and a vertex shader, and outputs data which is stored in memory 110. This data that is output may comprise primitive data, where the primitive data may comprise a plurality of vertex indices (e.g. three vertex indices) for each primitive and a buffer of vertex data (e.g. for each vertex, a UV coordinate and in various examples, other vertex attributes). Where indexing is not used, the primitive data may comprise a plurality of domain vertices (e.g. three domain vertices) for each primitive, where a domain vertex may comprise only a UV coordinate or may comprise a UV coordinate plus other parameters (e.g. a displacement factor and optionally, parent UV coordinates).

The tiling unit 104 reads the data generated by the geometry processing unit 102 (e.g. by a tessellation unit within the geometry processing unit 102) from memory 110, generates per-tile display lists and outputs these to the parameter memory 112. Each per-tile display list identifies, for a particular tile, those primitives which are at least partially located within, or overlap with, that tile. These display lists may be generated by the tiling unit 104 using a tiling algorithm. Subsequent elements within the GPU pipeline, such as the depth testing unit 106, can then read the data from parameter memory 112. The back end of the tiling unit 104 may also group primitives into primitive blocks.

The depth testing unit 106 accesses the per-tile display lists from the parameter memory 112 and performs depth tests on fragments of the primitives in the tile. Current depth values (which may be referred to as 'depth state') may be stored in and accessed from the depth buffer 113. If the depth test unit 106 determines that a fragment contributes to the image data, then one or more identifiers associated with the fragment, each referred to as a tag, are written to the tag buffer 114. The one or more identifiers may comprise a tag that identifies the primitive and a tag that identifies the primitive block that the primitive is part of. If, however, the fragment is found not to contribute to the image data (e.g. because its depth indicates that the fragment is further away than, or is occluded by, an opaque fragment, which may be referred to as an occluder, that is already stored in the tag buffer), then the tag associated with the fragment is not written to the tag buffer 114.

The tag buffer 114 holds tags for the fragments from the front-most primitives (i.e. those closest to the viewpoint, which may also be referred to as 'near-most') for each sample position in a tile. To store a tag for a fragment in the tag buffer 114, an identifier for the primitive of which the fragment is part is stored in a location that corresponds to the fragment and there is a 1:1 association between fragments and positions in the tag buffer.

The texturing/shading unit (TSU) 108 performs texturing and/or shading tasks. The term 'task' is used herein to refer to a group of one or more data-items (e.g. pixels or samples) and the work that is to be performed upon those data-items. For example, a task may comprise or be associated with a program or reference to a program (e.g. a fragment shader or a compute shader) in addition to a set of data that is to be processed according to the program, where this set of data may comprise one or more data-items. The term 'instance' (or 'program instance') is used herein to refer to individual instances that take a path through the code. An instance therefore refers to a single data-item (e.g. a single fragment or pixel, where in the context of the methods described herein, a fragment becomes a pixel when it has updated the output buffer, which may alternatively be known as the on-chip frame buffer or partition store) and a reference (e.g. pointer) to a program (e.g. a fragment shader) which will be executed on the data-item. A task therefore comprises one or more instances and typically comprises a plurality of instances. In the context of the methods described herein, nearly all instances (e.g. except for the end of tile instance) correspond to a fragment. The TSU 108 typically runs a plurality of instances in parallel with the same program counter (PC), e.g. 4 instances in parallel.

Tasks are generated when the tag buffer 114 is flushed through to the TSU 108. There are a number of different situations which trigger the flushing of the tag buffer 114. When the tag buffer 114 is flushed, tasks are formed by scanning out (or gathering) data relating to fragments from the tag buffer 114 and placing them into tasks (with each fragment corresponding to a separate instance, as described above). The maximum number of instances (and hence fragments) within a task is limited by the width of SIMD structure in the graphics architecture.

As shown in FIG. 1, the TSU 108 may comprise texture hardware 116 and shader hardware 118 (which may be referred to as a shader core). The texture hardware 116 comprises fixed function hardware to accelerate common operations, whereas the shader hardware 118 is programmable and typically performs any complex computations that are required. If both the texture hardware 116 and the shader hardware 118 have good utilisation (which implies that there is a balance between work performed by the two different parts of the TSU 108) then the TSU 108 (and hence the GPU pipeline 100) will operate efficiently. However, if there is an imbalance between the amount of work that needs to be performed by one or other of the texture hardware 116 and the shader hardware 118, one of these may have low utilisation and hence the overall utilisation of the TSU 108 (and GPU pipeline 100) will be reduced.

It will be appreciated that the GPU pipeline 100 may comprise elements in addition to those shown in FIG. 1 and the TSU 108 may comprise elements in addition to (or instead of any of) the texture hardware 116 and the shader hardware 118.

As described above, convolutions are a common operation in image processing algorithms (e.g. to perform a blur operation, such as a Gaussian blur, to perform edge detection or to sharpen an image). Convolutions often do not require complex mathematics to be performed but do require fetching of many texels for each output pixel, as defined by the kernel. As the fetching is performed by the texture hardware 116, this can result in an imbalance between the workloads of the texture hardware 116 (which has a high workload relative to normal usage as anticipated when the hardware was designed) and the shader hardware 118 (which has a low workload relative to normal usage as anticipated when the hardware was designed). The methods described herein reduce the imbalance by both reducing the number of fetch operations performed by the texture hardware 116 and increasing the work performed by the shader hardware 118.

Described herein are improved methods of operating a GPU pipeline (such as shown in FIG. 1) and in particular the TSU 108. As described in detail below, the methods reduce or eliminate the redundancy in texel fetches performed by the TSU, thereby reducing the workload of the texture hardware 116 within the TSU 108. As shown in FIG. 1, the texture hardware 116 comprises a fetch unit 120 (which performs the texel fetches) and may also comprise bilinear filter hardware 122 (which is configured to perform bilinear interpolation). In the methods described herein, the bilinear filter hardware 122 is bypassed which further increases the throughput of the texture hardware 116. As the bilinear filter hardware 122 is bypassed, the methods described herein may be used where there is a 1:1 correspondence between texels and sampling points, i.e. the sampling points are aligned with texel centres. The methods may also be used in situations where there is not a 1:1 correspondence, however, in these situations extra operations are required to undo any shader optimizations that may have been used that result in a lack of 1:1 correspondence between texels and sampling points (e.g. as described below with reference to FIG. 14).

Figure 2:
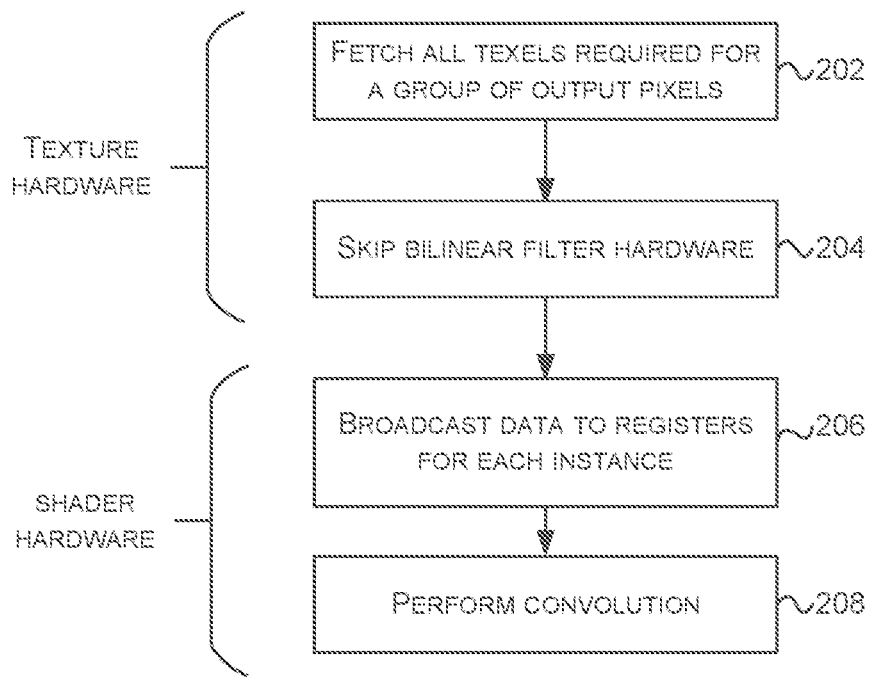
FIG. 2 shows a flow diagram of an example method of performing a convolution within a GPU pipeline.
Figure 3:
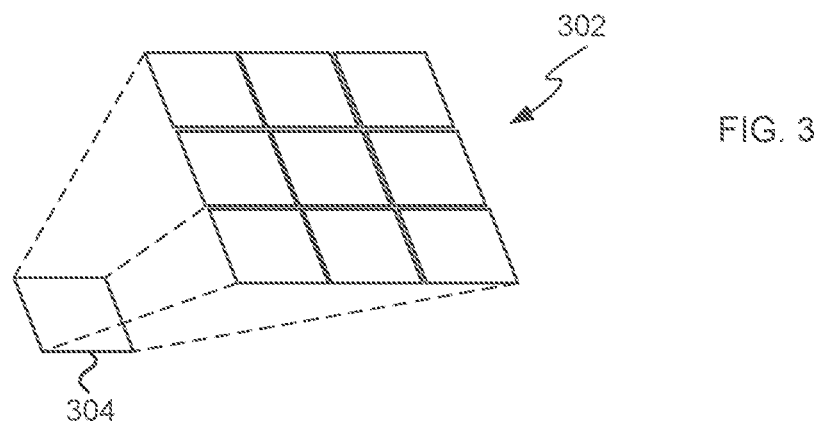
FIG. 3 shows a graphical representation of an example 3×3 kernel.
Figure 5:
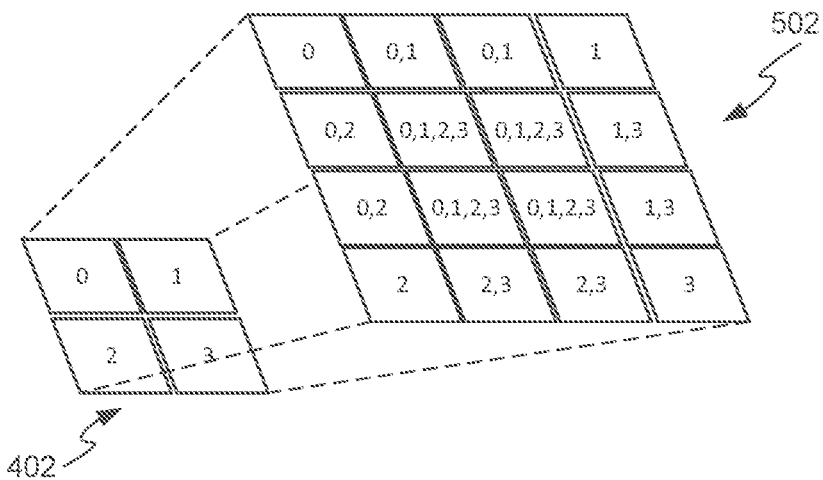
Figure 6:
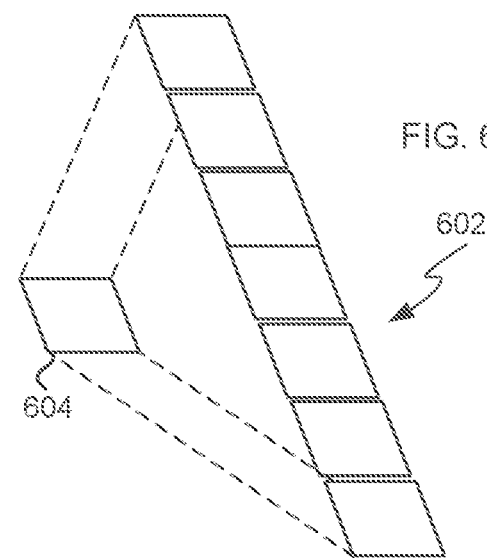
FIG. 6 shows a graphical representation of an example 1×7 kernel.

FIG. 2 shows a flow diagram of an example method of performing a convolution within a GPU pipeline 100, such as shown in FIG. 1. As shown in FIG. 2, the first part of the method (blocks 202, 204) is performed by the texture hardware 116 and the second part of the method (block 206, 208) is performed by the shader hardware 118. The method can be described with reference to two examples which are shown graphically in FIGS. 3-7. FIG. 3 shows a graphical representation of an example 3×3 kernel 302. In this example, 9 texels are used to calculate the properties of each output pixel 304. FIG. 6 shows a graphical representation of an example 1×7 kernel 602. In this example, 7 texels are used to calculate the properties of each output pixel 604. It will be appreciated that the methods described herein may be used with any kernel and those shown in FIGS. 3 and 6 are by way of example only. Whilst the example in FIG. 6 shows a vertical 1×7 kernel, it will be appreciated that the methods described herein are also applicable to horizontal kernels (e.g. a 7×1 kernel). Furthermore, the methods described herein may be used for separable kernels, e.g. a N×N kernel that is split into a N×1 and a 1×N pass.

In the first part of the method, the fetch unit 120 within the texture hardware 116 fetches all the texels required by a group of output pixels (block 202), where the group of output pixels comprises two or more output pixels and where each of the texels required by the group of output pixels is fetched only once. This is in contrast to known methods in which the fetch unit 120 performs independent fetch operations for each output pixel within the group of output pixels, which results in some texels being fetched multiple times. The group of output pixels which are subject to the collective fetch (in block 202) may correspond to the group of instances that the TSU 108 processes in parallel with the same PC.

Figure 4:
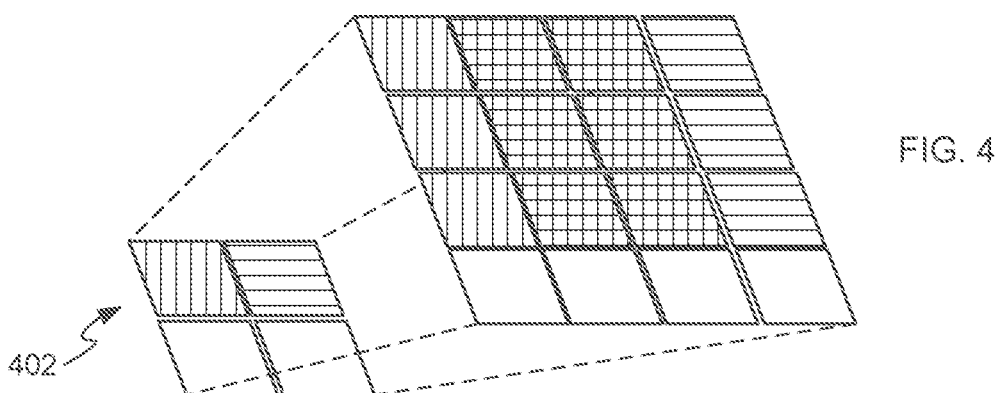
FIGS. 4 and 5 show two different graphical representations of the texels fetched for a 2×2 group of output pixels using the kernel of FIG. 3.

The saving in texel fetch operations can be described with reference to the example kernel 302 shown in FIG. 3. For a 2×2 group of output pixels 402, as shown in FIG. 4, each output pixel requires 9 texels to be fetched, and so using known methods (i.e. where independent fetches are performed for each output pixel) 4×9 texels would be fetched. Of these 36 texels that are fetched there is considerable duplication (i.e. the same texel is fetched more than once). As shown in FIG. 4, 6 of the texels that are required to calculate the properties of the top left output pixel (in the 2×2 grid) are also required to calculate the properties of the top right output pixel (as indicated by the cross-shading in FIG. 4). However, if the texels for the entire group of output pixels 402 are fetched collectively (in what may be considered a 'gather' operation), then only 16 texels are fetched. As shown in FIG. 5, where the output pixels in the group are denoted 0-3, of the group of 16 texels 502 that are fetched, only four are used to calculate the properties of a single output pixel and four of the texels (the centre four from the group of 16) are used to calculate the properties of each of the output pixels in the group of output pixels 402.

Figure 7:
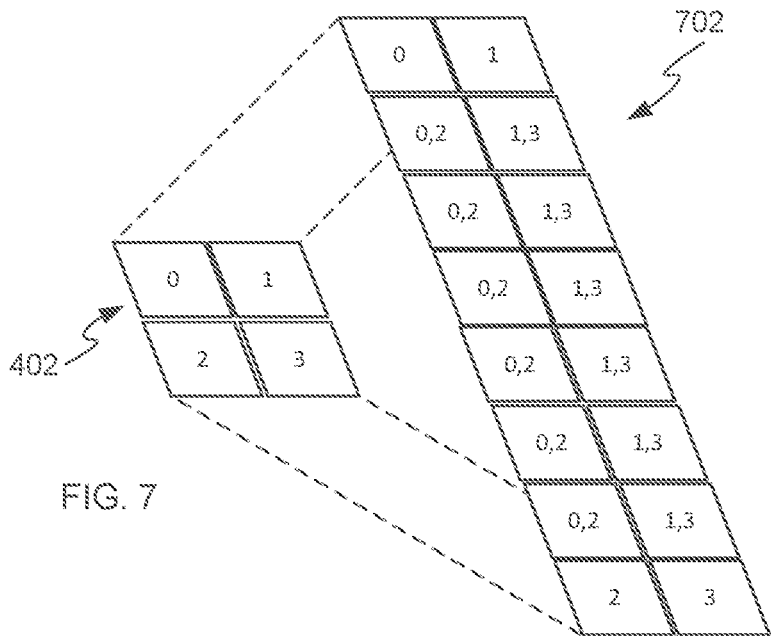
FIG. 7 shows a graphical representation of the texels fetched for a 2×2 group of output pixels using the kernel of FIG. 6.

The savings are slightly less for the example kernel 602 shown in FIG. 6. For a 2×2 group of output pixels 402, each output pixel requires 7 texels to be fetched, and so using independent fetches per output pixel 4×7 texels would be fetched. Of these 28 texels that are fetched there is considerable duplication; however, if the texels for the entire group of output pixels 402 are fetched collectively (in what may be considered a 'gather' operation), then only 16 texels are fetched. As shown in FIG. 7, where the output pixels in the group are again denoted 0-3, of the group of 16 texels 702 that are fetched, only four are used to calculate the properties of a single output pixel and the rest of the texels that are fetched are each used to calculate the properties of two of the output pixels in the group of output pixels 402.

Any suitable method may be used to implement the collective fetching for a group of output pixels (in block 202) and various examples are described below. Having performed the collective fetching (in block 202), the texture hardware 116 skips the bilinear filter hardware 122 (block 204), and outputs the fetched texels to the shader hardware 118.

In the second part of the method of FIG. 2, the sample pipeline 124 within the shader hardware 118 receives the texel data from the texture hardware 116 and broadcasts the data to registers allocated to each instance (block 206), where each instance corresponds to one of the output pixels in the group of output pixels. The broadcast (in block 206), which is implemented in hardware, may comprise broadcasting all of the texel data to all of the registers for all instances and the shader is then responsible to applying non-zero weightings to the appropriate subset of texel data (and zero weightings to the texel data that is not required for a particular instance). A pre-defined mapping between the fetched texels and the texels required to calculate the properties of each output pixel (e.g. a mapping as shown graphically in FIGS. 5 and 7) may be used by the shader to apply the appropriate weightings.

Alternatively, the broadcast (in block 206), which is implemented in hardware, may be selective such that all of the texel data is not broadcast to all of the registers for all instances, but instead the texel data that is required to calculate the properties of a particular output pixel are broadcast to the registers allocated to the corresponding instance (i.e. to the instance that corresponds to the particular output pixel). Such a selective broadcast operation (in block 206) uses a pre-defined mapping between the fetched texels and the texels required to calculate the properties of each output pixel (e.g. a mapping as shown graphically in FIGS. 5 and 7). Use of a selective broadcast operation reduces register pressure and access complexity compared to non-selective broadcast (described above); however, non-selective broadcast results in less complex hardware compared to use of selective broadcast.

By using the collective fetch (in block 202) followed by broadcast (in block 206), the redundancy in the fetch operation is avoided but there is still redundancy in the data stored in the registers. This further shifts the balance of work from the texture hardware 116 to the shader hardware 118.

Having performed the broadcast (in block 206), the texel data is located in registers as in known systems and the convolution can be performed (block 208) by the execution pipelines 126 in the shader hardware 118 without requiring any modification. The execution pipelines 126 access the texel data used in the convolution operations for an instance corresponding to a particular output pixel from the registers allocated to that instance.

It will be appreciated that whilst FIGS. 4, 5 and 7 show a 2×2 group of output pixels, in other examples there may be a different group of output pixels (e.g. in terms of number and/or arrangement of pixels) and it will further be appreciated that other kernels may be used than those shown in the examples of FIGS. 3-7.

In order to implement the collective fetch operation (in block 202), which may also be referred to as a 'unified gather', the shader (i.e. the fragment shader) may be modified by a compiler. There are a number of different ways that the collective fetch operation (in block 202) may be implemented within the shader and two examples are described below.

Figure 8:
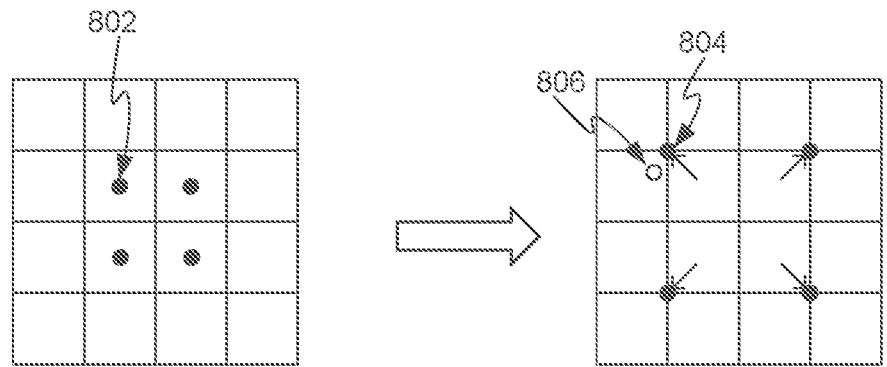
FIG. 8 shows a graphical representation of a first method of performing a collective fetch for the kernel of FIG. 3.
Figure 9:
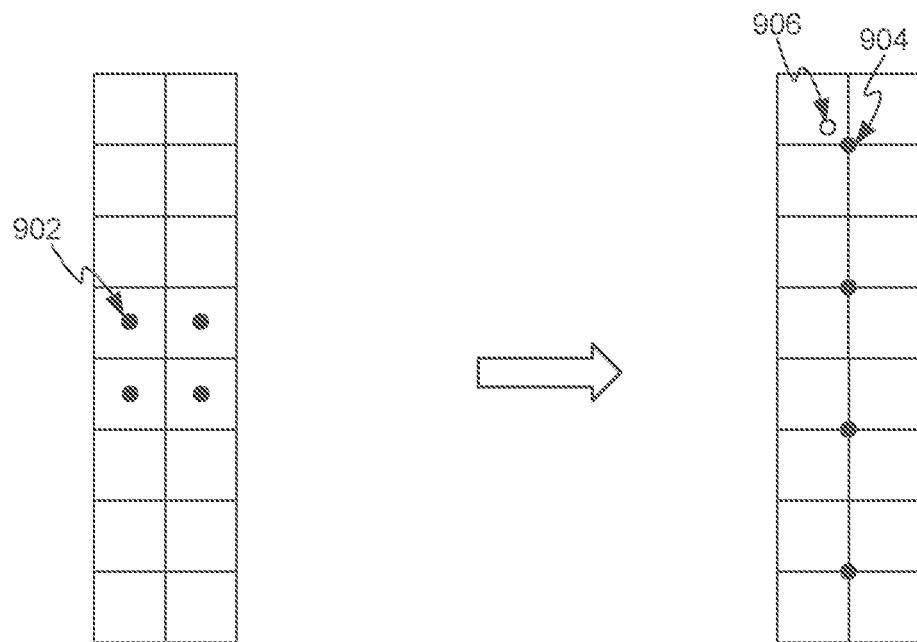
FIG. 9 shows a graphical representation of a first method of performing a collective fetch for the kernel of FIG. 6.

A first example method of implementing the collective fetch involves modifying the coordinates of the sample locations, as specified within the shader, so that instead of being in the centre of each of the output pixels (which matches 1:1 with the centre of a texel) 802, 902, the sample locations are at a point of intersection of a plurality of texels, e.g. a point of intersection of four texels 804, 904. This is shown graphically in FIGS. 8 and 9 for the two example kernels 302, 602 described above. By modifying the sample coordinate so that it does not lie on a texel centre, the fetch unit 120 automatically fetches the adjacent texels (i.e. the four adjacent texels). In known systems, the texture hardware 116 would then perform bilinear filtering of the fetched plurality of texels; however, as detailed above, in the method of FIG. 2, the bilinear filter hardware 122 is skipped and the raw texel data, as fetched by the fetch unit 120, is output to the shader hardware 118. Whilst the examples in FIGS. 8 and 9 show the modified sample coordinates being exactly at the intersection of four texels (i.e. exactly on the corners of four adjacent texels) which triggers the fetching of four adjacent texels, the modified sample coordinate may be offset from this position slightly without impacting the operation of the fetch unit 120 (i.e. such that the same four texels are fetched). The modified sample coordinate need only be such that the closest texels to the modified sample coordinate are those texels that need to be fetched as part of the collective fetch operation and two example alternative modified sample coordinates 806, 906 are shown in FIGS. 8 and 9.

Using the first example method for the collective fetch operation, the shader is modified so that it includes N fetch instructions for the group of M output pixels, each at a modified sample coordinate, resulting in the fetch unit 120 fetching n×N texels, where in the examples shown, N=M=n=4. In contrast, the unmodified shader includes F fetch instructions for each output pixel, each at a sample coordinate corresponding to a texel centre, where for the kernel 302 shown in FIG. 3, F=9 and for the kernel 602 shown in FIG. 6, F=7. Whilst in the examples shown, the number of texels fetched as a consequence of the offset is four (i.e. n=4), in other examples only two texels may be fetched (n=2) depending on the manner of the offset.

The modification of the sample coordinates according to this first example method involves calculation of the non-integer offsets indicated by the small arrows in FIG. 8 which may either be calculated with fixed-function hardware or as part of the shader program, where the former is most likely to avoid any performance penalty at a near negligible hardware complexity cost. A second example method described below avoids the need to perform these calculations of non-integer offsets.

Figure 10:
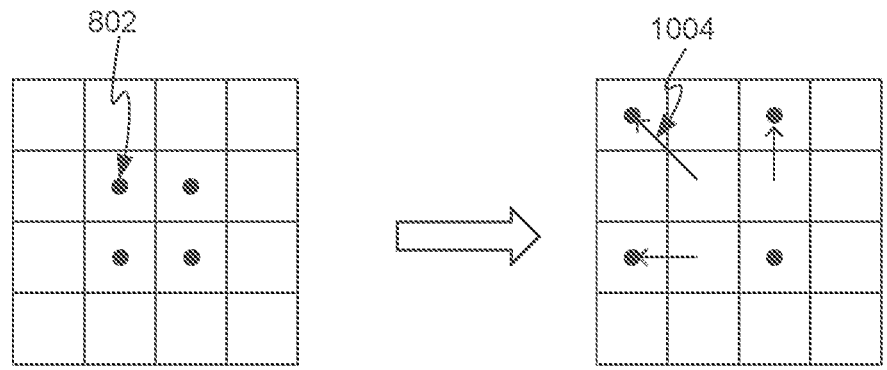
FIG. 10 shows a graphical representation of a second method of performing a collective fetch for the kernel of FIG. 3.
Figure 11:
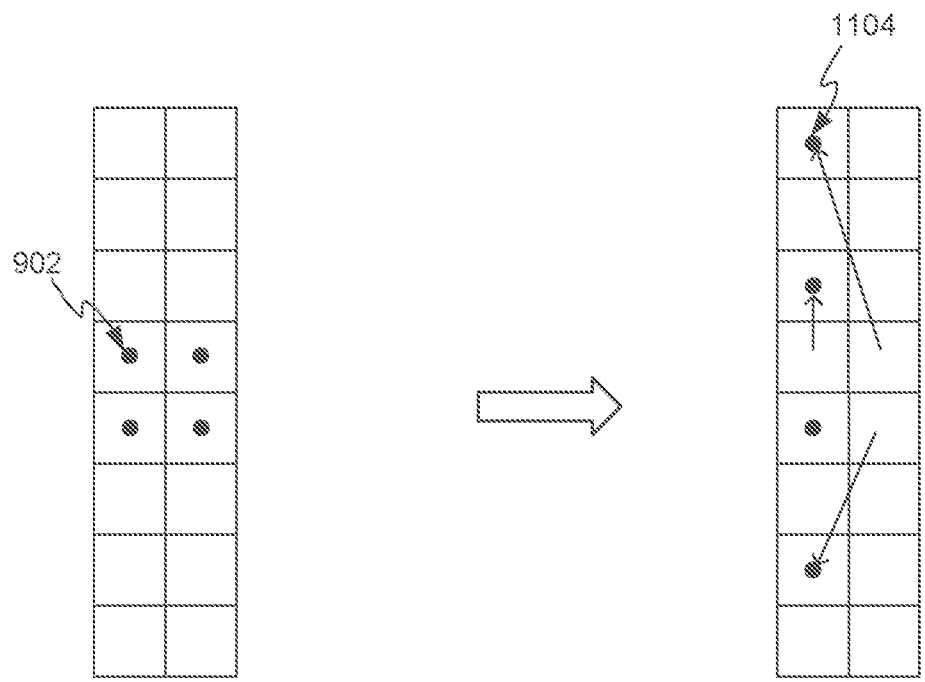
FIG. 11 shows a graphical representation of a second method of performing a collective fetch for the kernel of FIG. 6.

The second example method of implementing the collective fetch involves a new use of a known gather instruction, gather4, which typically fetches a group of 2×2 texels and is guaranteed to return all four texels even for on-sample coordinates. A gather4 instruction may be used to fetch a group of 2×2 texels with the centre of the top left texel (of the 2×2 group) being positioned at the sample coordinate. When used in the second example method, integer offsets of the sample coordinate from the output pixel centres are included, with different integer offsets for the sample coordinates corresponding to each of the output pixels in order to fetch the required arrangement of pixels. This is shown graphically in FIGS. 10 and 11 for the two example kernels 302, 602 described above. As shown in FIGS. 10 and 11, different integer offsets are applied for each of the gather operations, as indicated by the small arrows 1004, 1104, e.g. for the example in FIG. 10, the offsets are (−1,+1) for output pixel 0, (0,+1) for output pixel 1, (−1,0) for output pixel 2 and (0,0) for output pixel 3 and for the example in FIG. 11, the offsets are (0,+1) for output pixel 0, (−1,+3) for output pixel 1, (0,0) for output pixel 2 and (−1,−2) for output pixel 3. The texture lookup function has built-in support for integer coordinate offsets, with the offsets forming part of the instruction. The gather instruction enables programmable offsets and so by using the gather instructions, different offsets can be specified for each of the fetch operations within the 2×2 group.

The approach shown in FIGS. 10 and 11 has the benefit of being implemented with minimal hardware changes compared to the approach shown in FIGS. 8 and 9, but care needs to be taken that accuracy of sample location is sufficient to justify placement on the texels (where a slight error may result in the wrong patch being selected).

The standard known gather operation is limited to fetching texels from a top level of a MIP map, so for use in the second example method, the gather operation is modified so that it can fetch texels from any level of the MIP map, i.e. from levels which are not necessarily top level MIP maps.

Using the second example method for the collective fetch operation, the shader is modified so that it includes N gather instructions with offsets for the group of M output pixels, resulting in the fetch unit 120 fetching n×N texels, where in the examples shown, N=M=n=4. In contrast, the unmodified shader includes F fetch instructions for each output pixel, each at a sample coordinate corresponding to a texel centre, where for the kernel 302 shown in FIG. 3, F=9 and for the kernel 602 shown in FIG. 6, F=7.

Figure 12:
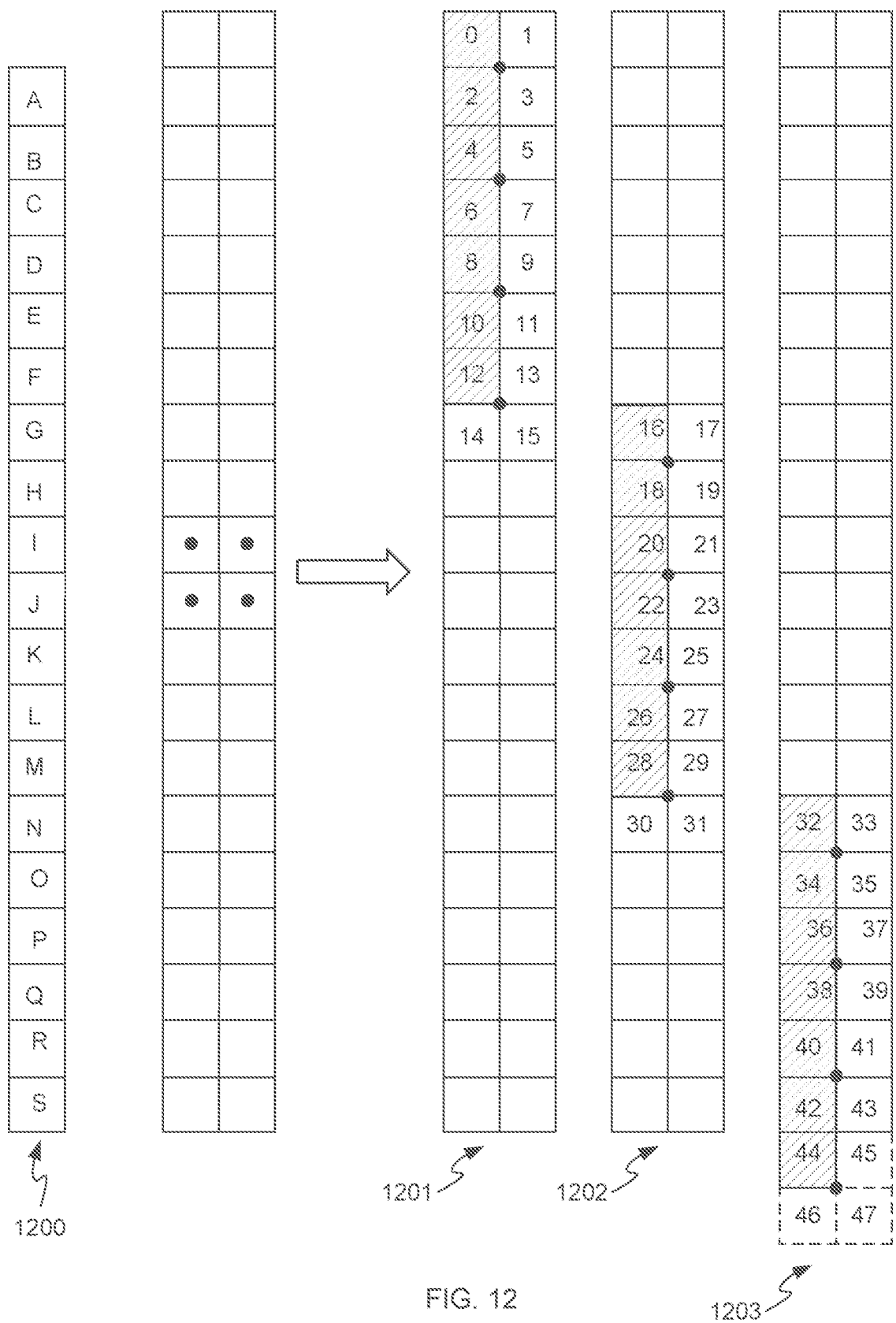
FIG. 12 shows a graphical representation of a first method of performing a collective fetch for a 19×1 kernel.

Although for the two example kernels shown, N=M, this may not be true for other kernels (e.g. for bigger kernels, N may be larger than M). In examples where N>M, the collective fetch operation (in block 202) may be logically divided into multiple sub-operations according to the first or second method, each sub-operation comprising no more than M fetch instructions. An example is shown graphically in FIG. 12 which corresponds to the first example method above with a 19×1 kernel 1200 where N=4, M=10. As shown in FIG. 12, the collective fetch operation is logically divided into three sub-operations 1201-1203, each comprising four fetch instructions, although there is some overlap of requests. Where there are overlapping requests for a particular instance, the duplicate data for that instance is discarded but the data may still be sent to other instances. For each sub-operation, each instance receives a 1×7 patch and in FIG. 12, the 1×7 patches for instance 0 are shown by shading. In examples where a smaller patch is required (as in the third sub-operation 1203 in FIG. 12, extra information may be provided to the hardware (by the shader) to let it know that only a subset of the fetched data will be used. This may reduce the demand on the system in one or more of the following places: (i) the hardware may perform a reduced number of fetches (e.g. only three fetches in the third sub-operation 1203 in the example of FIG. 12), thereby reducing memory bandwidth, although in other cases, the hardware may still perform all the fetches (ii) the broadcast operation workload may be reduced as the unwanted data may not be broadcast (e.g. in the example below, fetched texels 44-47 may not be broadcast), and (iii) the unwanted data may not be written to registers, thereby reducing register pressure.

Irrespective of the method used to implement the collective fetch operation, the method defines a mapping between the texels that are fetched and the kernels for each of the output pixels and this mapping is subsequently used by the shader hardware 118 when performing the broadcast operation (in block 206). The mapping defines, for each fetched texel, which instances it relates to (e.g. for which output pixels is the texel used to calculate the properties of the output pixel) and its position within the kernel for each instance.

The mapping may, for example, define how the data received from each of the N gather operations needs to be stitched together to form the patch of texels that is needed for the collective gather (e.g. the 4×4 patch of texels 502 shown in FIG. 5 or the 2×8 patch of texels 702 shown in FIG. 7). The manner of the stitching may be communicated to the shader hardware 118 by the texture hardware 116 in a sub-band (e.g. a 2-bit sub-band, which may indicate one of a pre-defined set of options such as 8×2, 2×8 and 4×4 along with an option that indicates that this method is not being used) alongside the fetched texel data.

Referring to the example shown in FIG. 12, if the positions with in the kernel 1200 are denoted A-S, and the texels are fetched in the order 0-39, then a mapping which defines that the texels are fetched in a 2×20 strip may in fact provide a short form indication that the mapping is as follows (where the broadcast locations are denoted instance, position with instances labelled 0-3 to correspond to the labelling of the output pixels):

| Fetched texel | Broadcast to |
| --- | --- |
| 0 | 0, A |
| 1 | 1, A |
| 2 | 0, B 2, A |
| 3 | 1, B 3, A |
| 4 | 0, C 2, B |
| 5 | 1, C 3, B |
| 6 | 0, D 2, C |
| 7 | 1, D 3, C |
| 8 | 0, E 2, D |
| 9 | 1, E 3, D |
| 10 | 0, F 2, E |
| 11 | 1, F 3, E |
| 12 | 0, G 2, F |
| 13 | 1, G 3, F |
| 14 | 2, G |
| 15 | 3, G |
| 16 | 0, H |
| 17 | 1, H |
| 18 | 0, I 2, H |
| 19 | 1, I 3, H |
| 20 | 0, J 2, I |
| 21 | 1, J 3, I |
| 22 | 0, K 2, J |
| 23 | 1, K 3, J |
| 24 | 0, L 2, K |

-continued

| Fetched texel | Broadcast to |
|---|---|
| 25 | 1, L 3, K |
| 26 | 0, M 2, L |
| 27 | 1, M 3, L |
| 28 | 0, N 2, M |
| 29 | 1, N 3, M |
| 30 | 2, N |
| 31 | 3, N |
| 32 | 0, O |
| 33 | 1, O |
| 34 | 0, P 2, O |
| 35 | 1, P 3, O |
| 36 | 0, Q 2, P |
| 37 | 1, Q 3, P |
| 38 | 0, R 2, Q |
| 39 | 1, R 3, Q |
| 40 | 0, S 2, R |
| 41 | 1, S 3, R |
| 42 | 2, S |
| 43 | 3, S |
| 44 | — |
| 45 | — |
| 46 | — |
| 47 | — |

Figure 13:
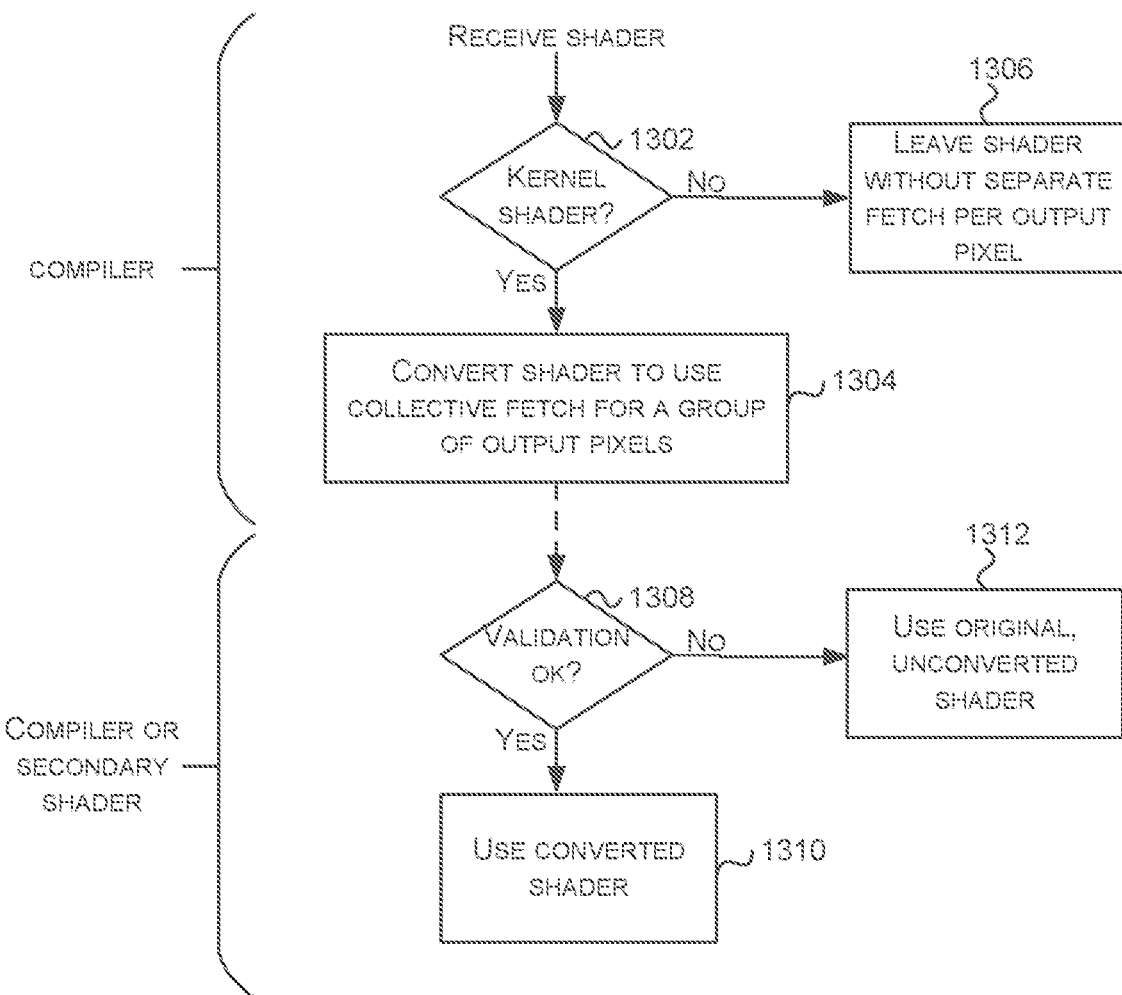
FIG. 13 is a flow diagram of a first example method of generating a converted shader to implement the method of FIG. 2.

As described above, as the bilinear filter hardware 122 is bypassed, the methods described herein may be used where there is a 1:1 correspondence between texels and sampling points in the original (unmodified) shader, i.e. the sampling points are aligned with texel centres. Consequently, the compiler may perform a check for this 1:1 correspondence (block 1302, where a shader with the 1:1 correspondence is referred to as a kernel shader), before converting shader to modify the fetch instructions to perform a collective fetch for a group of output pixels (block 1304), as shown in FIG. 13. In addition to checking for the 1:1 correspondence (in block 1302), the check may also involve checking that adjacent instances request adjacent texels. This may be determined by checking (i) that the input coordinate is offset by 1 texel from each of the other instances in the 2×2 stamp and (ii) that the texture resolution is equal to the render target resolution (i.e. texture size at LOD=render size). Additionally, the check (in block 1302) may involve checking that samples are arranged such that multiple samples can be combined into a single gather operation, i.e. that they all fall within a gatherable patch size. The determination of (i) and (ii) may depend upon sampling parameters if mipmap levels other than the base level area used. In particular, the determination may involve checking that an integer level of detail (LOD) is selected, either because nearest neighbour mipmap filtering is used or because the LOD itself is an integer value, and taking into account LOD clamps and biases. If the check fails ('No' in block 1302), then the shader is not modified in this way (block 1306) such that when the shader is executed independent fetches are performed for each output pixel.

In addition to checking the shader is a kernel shader (in block 1302), the check may also apply one or more additional constraints which limit the applicability of the method of FIG. 2. For example, an additional constraint may be applied such that the method of FIG. 2 is only used for certain data types, or for data having certain properties (e.g. in terms of size of texel data). In an example, an additional check may limit the application of the method of FIG. 2 only to low dynamic range (LDR) images, so as to limit the amount of data that is broadcast by the shader hardware 118 (in block 206). These additional constraints may, for example, be applied to ensure that the move of workload from the texture hardware 116 to the shader hardware 118 does not result in the opposite imbalance (i.e. such that the texture hardware 116 is not used efficiently).

In addition to the check (in block 1302) before converting the shader (in block 1304), it may be necessary to perform a subsequent check to validate the new shader (block 1308). If the validation passes ('Yes' in block 1308), then the converted shader can be used (block 1310) and if not, the original, unconverted shader is used (block 1312). As shown in FIG. 13, this secondary check (in block 1308) may be performed by the compiler (at compile time) or alternatively may be performed at runtime by a secondary shader which may be run periodically (e.g. per render or per tile). Where the secondary check is performed by a secondary shader, the compiler generates this secondary shader as part of, or following, the conversion of the shader (in block 1304).

In an example, there may not be sufficient information available at compile time to be 100% certain that the shader is a kernel shader, e.g. because some information (e.g. the size of the texture from which the texels are fetched) is not available. In such examples, the converted shader may be generated by the compiler (in block 1304) and then a check performed by a secondary shader at runtime (in block 1308) to determine which shader to use (e.g. the original shader or the modified shader generated in block 1304).

The checks performed by the secondary shader (in block 1308) may be as described above with reference to block 1302. The checks may, in particular, include checking that samples are arranged such that multiple samples can be combined into a single gather operation, i.e. that they all fall within a gatherable patch size (e.g. within a predefined maximum patch size). This check may, or may not, have initially been performed by the compiler (in block 1302). Such a check, which may be referred to as a 'range check' estimates the patch that the shader is trying to cover. For example, for a kernel shader with 9 samples, the secondary shader might estimate that it is sampling from −4 to +4, in either forward or reverse order (so also check +4 to −4). If the offsets are not known at compile time then this check cannot be performed at that time (i.e. it cannot be performed in block 1302) and this is instead checked at runtime (in block 1308) to confirm that the values fall within one of those expected sets of boundaries, e.g. Offset_0==−4 texels+/−tolerance, Offset_1==−3 texels+/−tolerance, etc.

Some shaders may already have been optimised to reduce the number of samples in the convolution algorithm by using the bilinear filter hardware 122 in the texture hardware 116 to perform bilinear interpolation (bilerp). In such an example, the sample positions are offset between two adjacent texel centres, such that the two adjacent texels are fetched by the fetch unit 120 and the bilinear filter hardware 122 performs bilinear filtering on the two fetched texels, to generate a single texel value, based on the offset. This halves the number of samples and weights in the convolution algorithm and the weights used in the convolution algorithm are modified to take into account the bilinear filtering that has already taken place.

Where such an optimization has been used, the shader may be referred to as a bilerp kernel shader (since it is a kernel shader, with bilinear interpolation optimization) and such a shader will fail the check (in block 1302) since the sample positions are offset from texel centres. Consequently, the methods described above cannot be used without modification.

Figure 14:
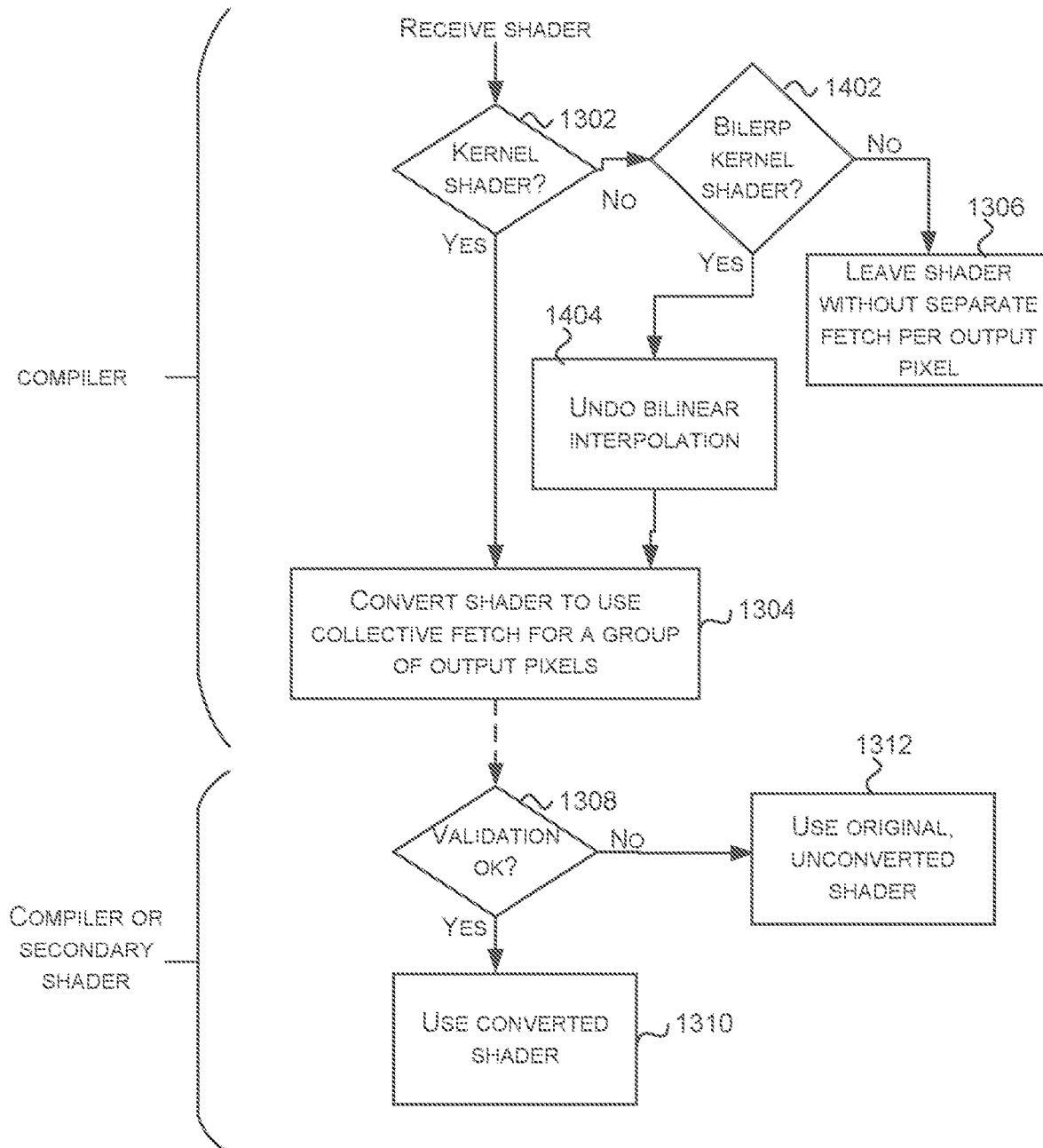
FIG. 14 is a flow diagram of a second example method of generating a converted shader to implement the method of FIG. 2.

FIG. 14 is a flow diagram of a modified version of the method shown in FIG. 13, which enables the methods described herein (including the method of FIG. 2) to be used for bilerp kernel shaders. As shown in FIG. 14, if the shader is not found to be a kernel shader (No' in block 1302), a check is performed to identify whether such an optimization has been used (block 1402). If this check is also failed, then the shader is not modified (block 1306); however, if that check is passed (Yes' in block 1402), then the compiler modifies the shader to undo the optimization using the bilinear filter hardware (block 1404) and the modified shader can then be optimized to use the collective fetch for a group of output pixels (in block 1304) as described above. This means that at runtime, the bilinear filter hardware is still skipped (block 204 of FIG. 2).

Various heuristics may be used to determine whether the shader is a bilerp kernel shader (in block 1402). For example, where the sample positions are all spread around a particular coordinate (with offsets, which may, for example, all be along one axis, either x or y) and/or the shader fetches an even number of texels per output pixel, it may be assumed that the shader is a bilerp kernel shader (because whilst a normal kernel will have an odd number of texels because it will have N above, N below and the central texel, giving 2N+1 which is always odd, the lerp optimization pairs these up, with an odd one out, so it will have N+1 samples which may be even or odd). Furthermore, one of the offsets may be different to all the others (e.g. it may be zero) and the convolution weights may be consistently distributed except for one. In contrast, where the shader fetches an odd number of texels per output pixel, it may not be possible to determine, without additional information (e.g. coordinate offsets, texture dimensions, etc.) whether the shader is a kernel shader or a bilerp kernel shader. In such examples, two different converted versions of the shader may be generated (in block 1304), one without undoing bilinear interpolation and one after undoing bilinear interpolation (in block 1404).

The bilerp reversal (in block 1404) reverses the optimization that has already been introduced in the shader. As described above, the optimized shader (i.e. the bilerp kernel shader) may define, for all except for one of the sample positions, a sample position that is on a line between two adjacent texel centres but is offset from both texel centres and a corresponding weight (which is used in the convolution). In some examples, the weights may be defined directly in the shader and in other examples, they may be supplied via parameters that are opaque to the compiler. Unless reversed, the offset sample position causes the texture hardware 116 to fetch both of the adjacent texels when the shader is executed. Consequently, to reverse the optimization, the shader is modified for each of the offset sample positions, to explicitly fetch each of the two adjacent texels and to separately define weights used in the convolution for each of the pair of texels. Calculation of the weights for each of the pair of texels involves taking the original single weight and allocating it to both texels and then modifying each weight based on the offset of the sample position to compensate for the fact that the bilinear interpolation has not been performed. As noted above, there may be one sample position which is not offset and so this fetch, and the corresponding convolution weight, is left unchanged during the bilerp reversal. If both the weights and sample distributions are known at compile time then the modified weights can be calculated at compile time, otherwise the modified weights may be evaluated in a secondary shader at runtime.

Figure 15A:
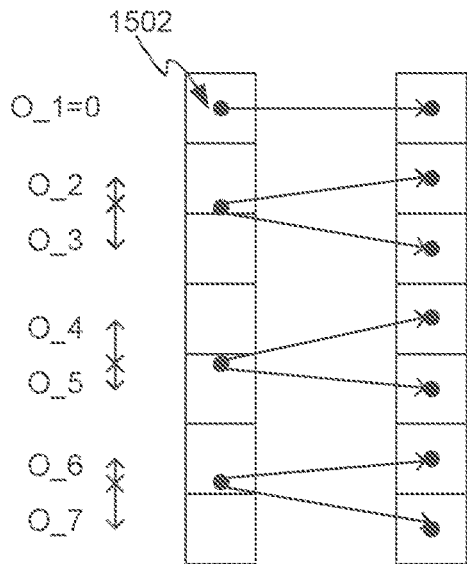
FIGS. 15A and 15B show graphical representations of bilerp reversal.
Figure 15B:
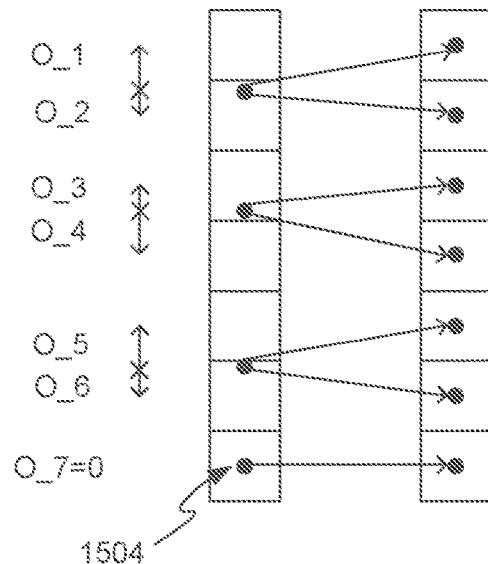

FIGS. 15A and 15B show two graphical representations of the bilerp reversal (in block 1404): in the first, as shown in FIG. 15A, the sample position 1502 that is not offset is at the top and in the second, as shown in FIG. 15B, the sample position 1504 that is not offset is at the bottom. Although the odd one out in the pairing arrangement may occur anywhere in the list, the top and bottom are the only positions used in practice. Working out which texels a sample position is between may be determined using modulo maths. If the convolution weights for the original four sample positions (which may be denoted positions A-D) are $W\_A$, $W\_B$, $W\_C$ and $W\_D$, then the modified weights for the resultant 7 sample positions (which may be denoted 1-7) may be given by:

| First example (FIG. 15A) | Second example (FIG. 15B) |
|---|---|
| $W\_1 = W\_A$ | $W\_1 = O\_1 \times W\_A$ |
| $W\_2 = O\_2 \times W\_B$ | $W\_2 = O\_2 \times W\_A$ |
| $W\_3 = O\_3 \times W\_B$ | $W\_3 = O\_3 \times W\_B$ |
| $W\_4 = O\_4 \times W\_C$ | $W\_4 = O\_4 \times W\_B$ |
| $W\_5 = O\_5 \times W\_C$ | $W\_5 = O\_5 \times W\_C$ |
| $W\_6 = O\_6 \times W\_D$ | $W\_6 = O\_6 \times W\_C$ |
| $W\_7 = O\_7 \times W\_D$ | $W\_7 = W\_D$ |

As described above, various criteria may be used to identify whether the shader is a bilerp kernel shader (in block 1402); however, it may not be possible to be entirely confident whether the shader is a bilerp kernel shader at the outset. Consequently, a check may be performed on the converted shader (in block 1308) by the compiler before the converted shader can be used.

As described above with reference to FIG. 13, the checks performed by the secondary shader (in block 1308) may, in particular, include checking that samples are arranged such that multiple samples can be combined into a single gather operation, i.e. that they all fall within a gatherable patch size. This range check, which estimates the patch that the shader is trying to cover, may, or may not, have initially been performed by the compiler (in block 1302). For example, for a bilerp kernel shader with 9 samples, the secondary shader might estimate that the range is −9 texels <offset_0<−7 texels, −7 texels <offset_1<−5 texels, etc. where each is covering a range of 2 texels to account for the lerp. The secondary shader may take a guess at the direction and also whether the odd one out (the one which could not be paired) is at the start or end.

In addition, or instead, it may not be possible to be entirely confident that the shader is a bilerp kernel shader (or a kernel shader) or not at compile time. Consequently, a check may be performed by a secondary shader at runtime (in block 1308) and a decision made as to whether to use the original shader or the converted shader. In some examples, as described above, the compiler may generate two different versions of the converted shader: one that includes reversal of a suspected bilerp optimization and one that does not (where both implement the collective gather and broadcast) and then based on the outcome of execution of the secondary shader (which may set a value of one or more shader selection bits), one of three shaders is run: (i) the original unmodified shader, (ii) the modified shader without the bilerp reversal, or (iii) the modified shader with the bilerp reversal.

Although FIG. 14 shows two checks at the outset (in blocks 1302 and 1402), in some examples the checks may be configured differently. For example, there may be an additional initial check (prior to block 1302) that filters out those shaders which can be determined to be definitely not either a kernel shader or a bilerp kernel shader and then more detailed checks are performed (in blocks 1302 and 1402) to determine whether the shader is, or is likely to be, a kernel shader or a bilerp kernel shader. Where implemented, these initial checks (prior to block 1302) comprise checking for one or more of the following:

The shader uses too few samples (e.g. the shader has fewer than 4 samples)

The fraction of instructions which are samples is too low (e.g. less than 1 in 10 instructions is a sample)

The samples are not based around a central point (e.g. sample locations aren't (frag_coordinate+offset)

The samples are noy consumed by a summing tree

The pattern of offsets does not allow for multiple samples to be reduced to one gather Of these five possible checks, the first two rule out the vast, vast majority of shaders that are neither a kernel shader or a bilerp kernel shader.

As described above, in some scenarios it may not be possible to be 100% certain at compile time, or without doing additional analysis, whether a shader is a kernel shader or a bilerp kernel shader. In such situations, the method may proceed to generate one or two modified shaders (in block 1304, e.g. with and/or without bilerp reversal in block 1304) and then a subsequent check, either at the end of compilation or at runtime (in block 1308) may determine which shader should be used.

Where the method of FIG. 2 is used for a bilerp kernel shader, the reversal of the optimization potentially increases the work of the texture hardware 116; however the effect of the collective gather results in a significantly larger reduction in work of the texture hardware 116 and so, overall, there is a larger benefit by undoing the bilerp optimization and then using the method of FIG. 2, compared to simply using the bilerp optimization.

Figure 16:
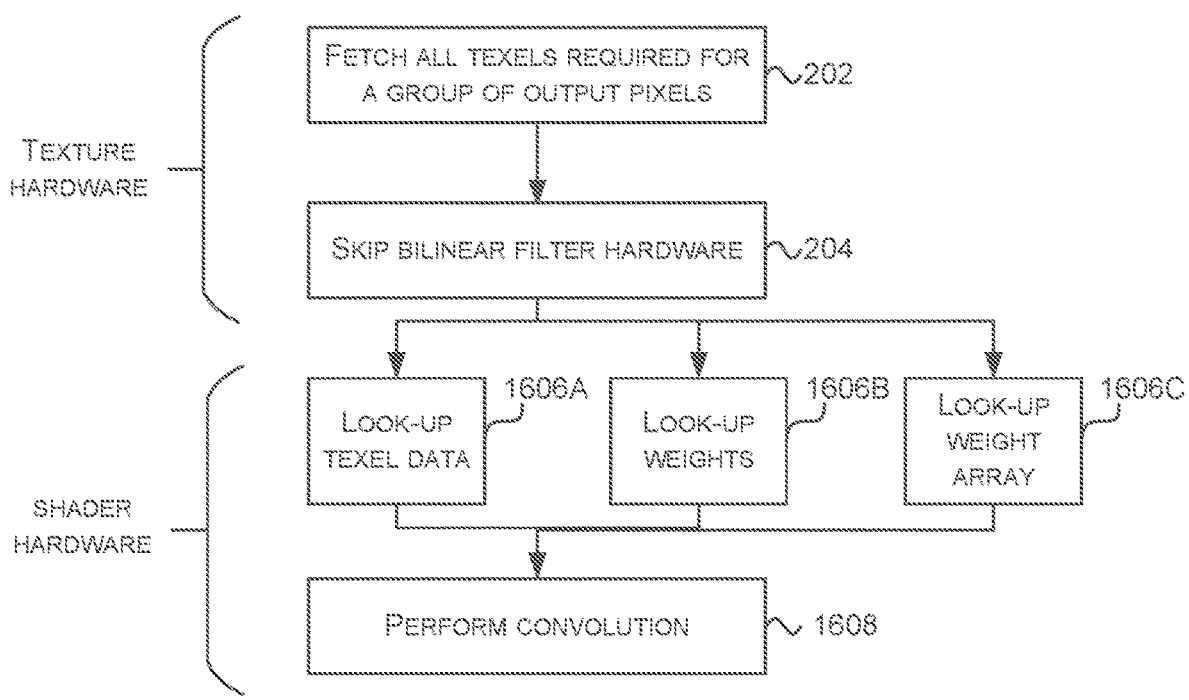
FIG. 16 shows a flow diagram of a second example method of performing a convolution within a GPU pipeline which is a variation on that shown in FIG. 2.

In the methods described above, the redundancy in the fetch operation for a group of output pixels is eliminated by the use of a collective fetch (in block 202), but there is redundancy in the data stored in the registers, with the texel data being broadcast to one or more register locations (in block 206). Alternatively, however, the broadcast step may be omitted, and the fetched texel data stored in shared registers for the group of output pixels or the broadcast may still occur but in a simplified form so that all the fetched texels (e.g. all 16 texels in the example of a 3×3 kernel) are placed into each instance's individual registers, but without adjusting for which instance is which (e.g. such that register N contains the same data for all four instances, rather than adjusting for the offset of the instance). This avoids the data redundancy but adds redundancy and complexity to the convolution operation. In such examples, the convolution operation for each output pixel is modified to access the shared registers and is further modified so that the correct weights and texel data is used, as shown in FIG. 16, which is a variation on the method shown in FIG. 2 and described above. The modification to the convolution operation relates principally to the accessing of the data used in the convolution operation itself (block 1608) and this data look-up may be achieved in a number of different ways. Three examples of the data look-up (blocks 1606A-C) are described below with reference to FIGS. 17A-17O which are shown for the kernel 302 shown in FIG. 3 and a 2×2 group of output pixels (as shown in FIGS. 4 and 5). In all these examples, the number of multiplications performed, as part of the convolution operation for each of the output pixels (in block 1608), corresponds to the number of texels that were fetched in the collective gather (e.g. 16 for the examples shown in FIGS. 3-5).

In the example shown in FIG. 17A, a look-up is performed (block 1606A) so that the texel data for the required 9 texels (i.e. for those texels in the kernel for the output pixel) is extracted and used in the convolution and the data for the remaining 7 texels is unused. In the example shown in FIG. 17B, a look-up is performed (block 1606B) to select the right 4×4 weight array from a 5×5 weight array. The 4×4 array that is selected comprises the convolution weights for the required 9 texels and the convolution weights for the remaining 7 texels are replaced by zeros (so that they do not have any effect on the properties of the output pixel). In the example shown in FIG. 17C, a look-up of a weight array is performed (block 1606C), with one weight array being stored per output pixel. Each of the weight arrays comprises the convolution weights for the required 9 texels with the convolution weights for the remaining 7 texels being set to zero (so that they do not have any effect on the properties of the output pixel). In a further option (not shown in the figures), a function may be used to calculate the weights in the shader at runtime. This may be used where at compile time the weights are known and the compiler is able to fit a function to those weights (e.g. as a function of texel index), such that the weights for unused texels are zero. In this option, the function is defined in the modified shader and executed at runtime such that a weight can be calculated for each texel (e.g. based on a texel index).

Using the methods described herein, the efficiency of the TSU 108 is increased by balancing workload between the texture hardware 116 and the shader hardware 118. At the same time, use of a collective gather (as described above) does not significantly affect efficiencies that may already exist as a consequence of cache coherency because texels are still fetched in approximately the same order.

Whilst the methods are described above with reference to the example GPU pipeline 100 shown in FIG. 1, it will be appreciated that the methods may be used in other GPU pipelines which comprise a TSU including both texture hardware and shader hardware. In particular, whilst the GPU pipeline 100 shown in FIG. 1 includes a tiling unit 104 and hence uses tile-based rendering, the methods described herein may also be used with other rendering schemes (e.g. non-tile-based rendering schemes such as immediate mode rendering).

Figure 18:
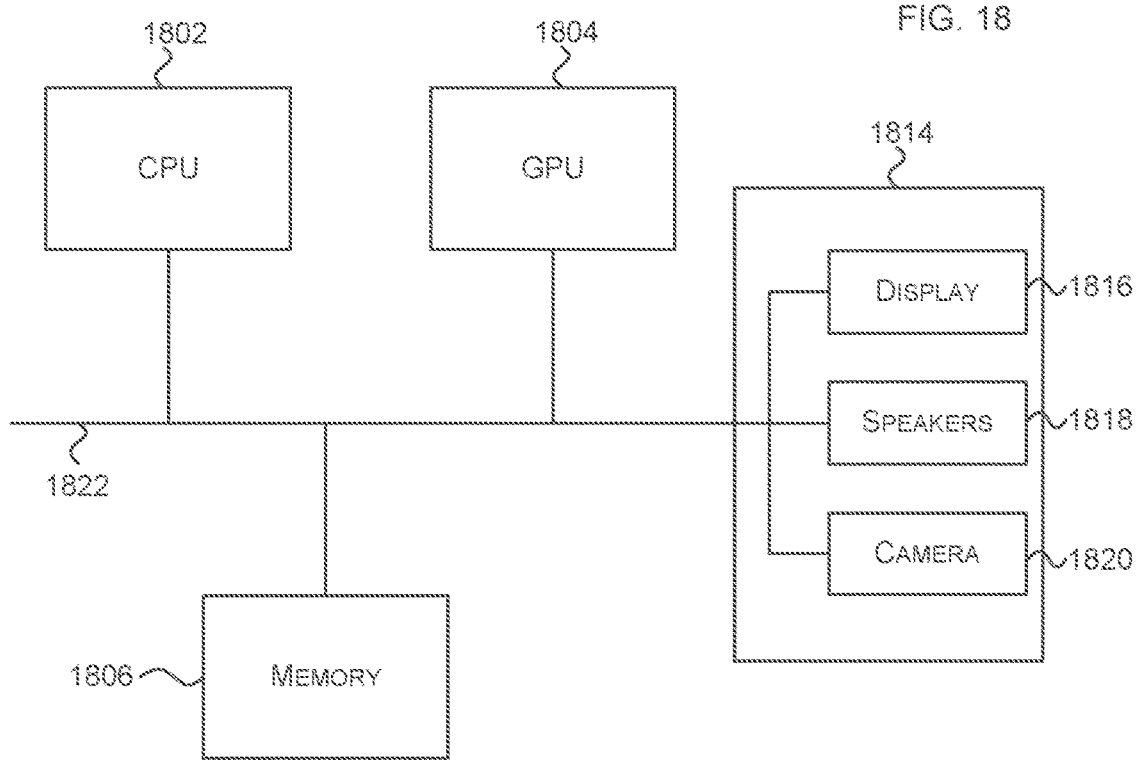
FIG. 18 shows a computer system in which a graphics processing system is implemented.

FIG. 18 shows a computer system in which the graphics processing systems described herein may be implemented. The computer system comprises a CPU 1802, a GPU 1804, a memory 1806 and other devices 1814, such as a display 1816, speakers 1818 and a camera 1820. The methods described herein may be implemented within the GPU 1804. The components of the computer system can communicate with each other via a communications bus 1822.

The GPU pipeline 100 of FIG. 1 is shown as comprising a number of functional blocks. This is schematic only and is not intended to define a strict division between different logic elements of such entities. Each functional block may be provided in any suitable manner. It is to be understood that intermediate values described herein as being formed by any of the elements within the GPU pipeline 100 need not be physically generated by the GPU pipeline at any point and may merely represent logical values which conveniently describe the processing performed by the GPU pipeline between its input and output.

The texture described herein may be embodied in hardware on an integrated circuit. The texturing/shading unit described herein may be configured to perform any of the methods described herein. Generally, any of the functions, methods, techniques, or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block, or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language, or a scripting language. Executable code includes binary code, machine code, bytecode, code defining an integrated circuit (such as a hardware description language or netlist), and code expressed in a programming language code such as C, Java, or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a texturing/shading unit configured to perform any of the methods described herein, or to manufacture a texturing/shading unit comprising any apparatus described herein. An integrated circuit definition dataset may be, for example, an integrated circuit description.

Therefore, there may be provided a method of manufacturing, at an integrated circuit manufacturing system, a texturing/shading unit as described herein. Furthermore, there may be provided an integrated circuit definition dataset that, when processed in an integrated circuit manufacturing system, causes the method of manufacturing a texturing/shading unit to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (RTM) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a texturing/shading unit will now be described with respect to FIG. 19.

Figure 19:
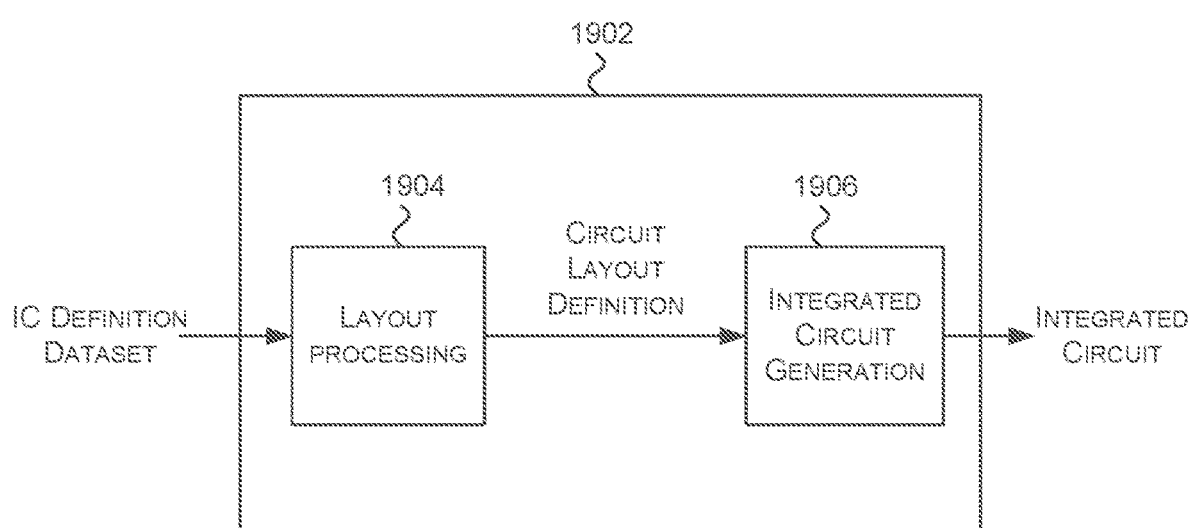
FIG. 19 shows an integrated circuit manufacturing system for generating an integrated circuit embodying a graphics processing system.

FIG. 19 shows an example of an integrated circuit (IC) manufacturing system 1902 which is configured to manufacture a texturing/shading unit as described in any of the examples herein. In particular, the IC manufacturing system 1902 comprises a layout processing system 1904 and an integrated circuit generation system 1906. The IC manufacturing system 1902 is configured to receive an IC definition dataset (e.g. defining a texturing/shading unit as described in any of the examples herein), process the IC definition dataset, and generate an IC according to the IC definition dataset (e.g. which embodies a texturing/shading unit as described in any of the examples herein). The processing of the IC definition dataset configures the IC manufacturing system 1902 to manufacture an integrated circuit embodying a texturing/shading unit as described in any of the examples herein.

The layout processing system 1904 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1904 has determined the circuit layout it may output a circuit layout definition to the IC generation system 1906. A circuit layout definition may be, for example, a circuit layout description.

The IC generation system 1906 generates an IC according to the circuit layout definition, as is known in the art. For example, the IC generation system 1906 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1906 may be in the form of computer-readable code which the IC generation system 1906 can use to form a suitable mask for use in generating an IC.

The different processes performed by the IC manufacturing system 1902 may be implemented all in one location, e.g. by one party. Alternatively, the IC manufacturing system 1902 may be a distributed system such that some of the processes may be performed at different locations and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a texturing/shading unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 19 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 19, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget."

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A computer system comprising one or more processors and a memory, the memory comprising computer readable instructions that, when executed by the one or more processors, cause the computer system to:
   receive a shader;
   determine whether the shader is a kernel shader; and
   in response to determining that the shader is a kernel shader, modifying the shader to perform a collective fetch of all texels used in convolution operations for a group of output pixels instead of performing independent fetches of texels for each output pixel in the group of output pixels.

2. A non-transitory computer readable storage medium having stored thereon computer readable instructions that, when executed at a computer system, cause the computer system to:
   receive a shader;
   determine whether the shader is a kernel shader; and
   in response to determining that the shader is a kernel shader, modifying the shader to perform a collective fetch of all texels used in convolution operations for a group of output pixels instead of performing independent fetches of texels for each output pixel in the group of output pixels.

3. A method comprising:
   receiving a shader;
   determining whether the shader is a kernel shader; and
   in response to determining that the shader is a kernel shader, modifying the shader to perform a collective fetch of all texels used in convolution operations for a group of output pixels instead of performing independent fetches of texels for each output pixel in the group of output pixels.

4. The method according to claim 3, wherein modifying the shader to perform a collective fetch of all texels used in convolution operations for a group of output pixels instead of performing independent fetches of texels for each output pixel in the group of output pixels comprises:
   modifying the shader to include a plurality of fetch instructions for different sample positions, each sample position being offset from a texel centre and defining a different, non-overlapping patch of adjacent texels to be fetched.

5. The method according to claim 3, wherein modifying the shader to perform a collective fetch of all texels used in convolution operations for a group of output pixels instead of performing independent fetches of texels for each output pixel in the group of output pixels comprises:
   modifying the shader to include a plurality of gather operations for different sample positions, each sample position being offset by integer values from a centre of one of the output pixels and defining a different, non-overlapping patch of adjacent texels to be fetched.

6. The method according to claim 3, wherein determining whether the shader is a kernel shader comprises:
   determining if there is a 1:1 correspondence between texels and sampling points in the received shader, wherein if there is no correspondence the shader is not a kernel shader.

7. The method according to claim 3, further comprising:
   in response to determining that the shader is not a kernel shader, leaving the shader unmodified.

8. The method according to claim 3, further comprising:
   determining whether the shader is an optimized kernel shader that uses bilinear interpolation; and
   in response to determining that the shader is an optimized kernel shader:
      adapting the shader to reverse the bilinear interpolation;
      modifying the adapted shader to perform a collective fetch of all texels used in convolution operations for a group of output pixels instead of performing independent fetches of texels for each output pixel in the group of output pixels.

9. The method according to claim 8, wherein adapting the shader to reverse the bilinear interpolation comprises:
   modifying each offset sample position in the shader to explicitly fetch two adjacent texels; and
   defining separate weights for each of the two adjacent texels.

10. The method according to claim 9, wherein defining separate weights for each of the two adjacent texels comprises:
   allocating a weight associated with the offset sample position to each of the adjacent texels; and
   for each of the adjacent texels, modifying the allocated weight based on an offset of the offset sample position.

11. The method according to claim 9, wherein adapting the shader to reverse the bilinear interpolation further comprises:
   for any non-offset sample position in the shader, leaving the sample position and associated weight unchanged.

12. The method according to claim 8, wherein determining whether the shader is an optimized kernel shader that uses bilinear interpolation comprises:
   determining whether sample positions in the shader are spread around a common coordinate with offsets, wherein if the sample positions are spread around a common coordinate, the shader is an optimized kernel shader.

13. The method according to claim 8, wherein determining whether the shader is an optimized kernel shader that uses bilinear interpolation comprises:
   determining whether convolution weights in the shader are all consistently distributed except for one convolution weight, wherein if all except for one of the convolution weights in the shader are consistently distributed, the shader is an optimized kernel shader.

14. The method according to claim 8, further comprising:
   in response to determining that the shader is not a kernel shader or an optimized kernel shader, leaving the shader unmodified.

15. The method according to claim 3, wherein determining whether the shader is an optimized kernel shader that uses bilinear interpolation comprises:
   determining whether the shader fetches an even number of texels, wherein if the shader fetches an even number of texels, the shader is an optimized kernel shader.

16. The method according to claim 3, further comprising:
   validating the modified shader; and
   in response to the validation failing, reverting to the received, unmodified, shader.

17. The method according to claim 16, wherein validating the secondary shader comprises:
   checking that all the texels used in convolution operations for the group of output pixels fall within a predefined maximum patch size.

18. The method according to claim 3, further comprising:
   generating a secondary shader configured to validate the modified shader when executed, in response to the validation passing, to trigger use of the modified shader and in response to the validation failing, to trigger use of the received, unmodified, shader.

* * * * *

UNITED STATES PATENT AND TRADEMARK OFFICE
CERTIFICATE OF CORRECTION

| | | |
|---|---|---|
| PATENT NO. | : 12,154,209 B2 | Page 1 of 1 |
| APPLICATION NO. | : 17/849539 | |
| DATED | : November 26, 2024 | |
| INVENTOR(S) | : Rostam King et al. | |

It is certified that error appears in the above-identified patent and that said Letters Patent is hereby corrected as shown below:

In the Specification

Column 15, Line 58:
Figs. 17A-17O

Should read as:
-- Figs. 17A-17C --

Signed and Sealed this
Twenty-first Day of January, 2025

Coke Morgan Stewart
*Acting Director of the United States Patent and Trademark Office*